(12) United States Patent
Fischer et al.

(10) Patent No.: US 8,079,381 B2
(45) Date of Patent: Dec. 20, 2011

(54) HANDLE ASSEMBLY FOR A WATER CONTROL VALVE

(75) Inventors: Keith R. Fischer, Kiel, WI (US);
Douglas J. Brouwer, Sheboygan, WI (US); Brian S. Core, Fond du Lac, WI (US); David H. Ritter, Kohler, WI (US)

(73) Assignee: Kohler Co., Kohler, WI (US)

( * ) Notice: Subject to any disclaimer, the term of this patent is extended or adjusted under 35 U.S.C. 154(b) by 249 days.

(21) Appl. No.: 12/369,824

(22) Filed: Feb. 12, 2009

(65) Prior Publication Data

US 2010/0200081 A1  Aug. 12, 2010

(51) Int. Cl.
*F16L 5/00* (2006.01)
(52) U.S. Cl. .................................. 137/359; 137/315.15
(58) Field of Classification Search ................ 137/359, 137/360, 801, 315.15; 4/678
See application file for complete search history.

(56) References Cited

U.S. PATENT DOCUMENTS

| | | | | |
|---|---|---|---|---|
| 4,478,249 | A * | 10/1984 | Fleischmann | 251/259 |
| 4,766,642 | A | 8/1988 | Gaffney et al. | |
| 4,998,555 | A * | 3/1991 | Barhydt et al. | 137/359 |
| 5,291,622 | A | 3/1994 | Humpert | |
| 5,558,128 | A * | 9/1996 | Pawelzik et al. | 137/801 |
| 5,947,149 | A * | 9/1999 | Mark | 137/359 |
| 6,220,278 | B1 | 4/2001 | Sauter et al. | |
| 6,757,921 | B2 | 7/2004 | Esche | |
| 7,540,300 | B2 * | 6/2009 | Thomas et al. | 137/359 |
| 2005/0138726 | A1 | 6/2005 | Daly | |
| 2006/0174946 | A1 | 8/2006 | Kajuch | |

FOREIGN PATENT DOCUMENTS

| | | |
|---|---|---|
| EP | 121219 | 10/1984 |
| EP | 1479836 | 11/2004 |

OTHER PUBLICATIONS

Six pages of an EP search report of EP10001277 dated May 25, 2010 in a corresponding EP application.

* cited by examiner

*Primary Examiner* — Kevin Lee
(74) *Attorney, Agent, or Firm* — Foley & Lardner LLP

(57) ABSTRACT

A handle assembly is disclosed that is suitable for mounting a valve housing that has a valve stem to a support. In one form, the handle assembly includes a handle, an escutcheon, a bonnet, a recess, and a flexible snap ring. The handle is operationally linked to the valve stem of the valve housing for controlling movement of the valve stem. The escutcheon is positionable on a first side of the support adjacent the handle. The bonnet is linked to the valve housing. The recess is formed in one of the bonnet and escutcheon. The flexible snap member mounted to the other of the bonnet and escutcheon and suitable to snap into the recess when the bonnet and escutcheon are telescoped together, while thereafter permitting relative rotation of the bonnet and escutcheon.

16 Claims, 5 Drawing Sheets

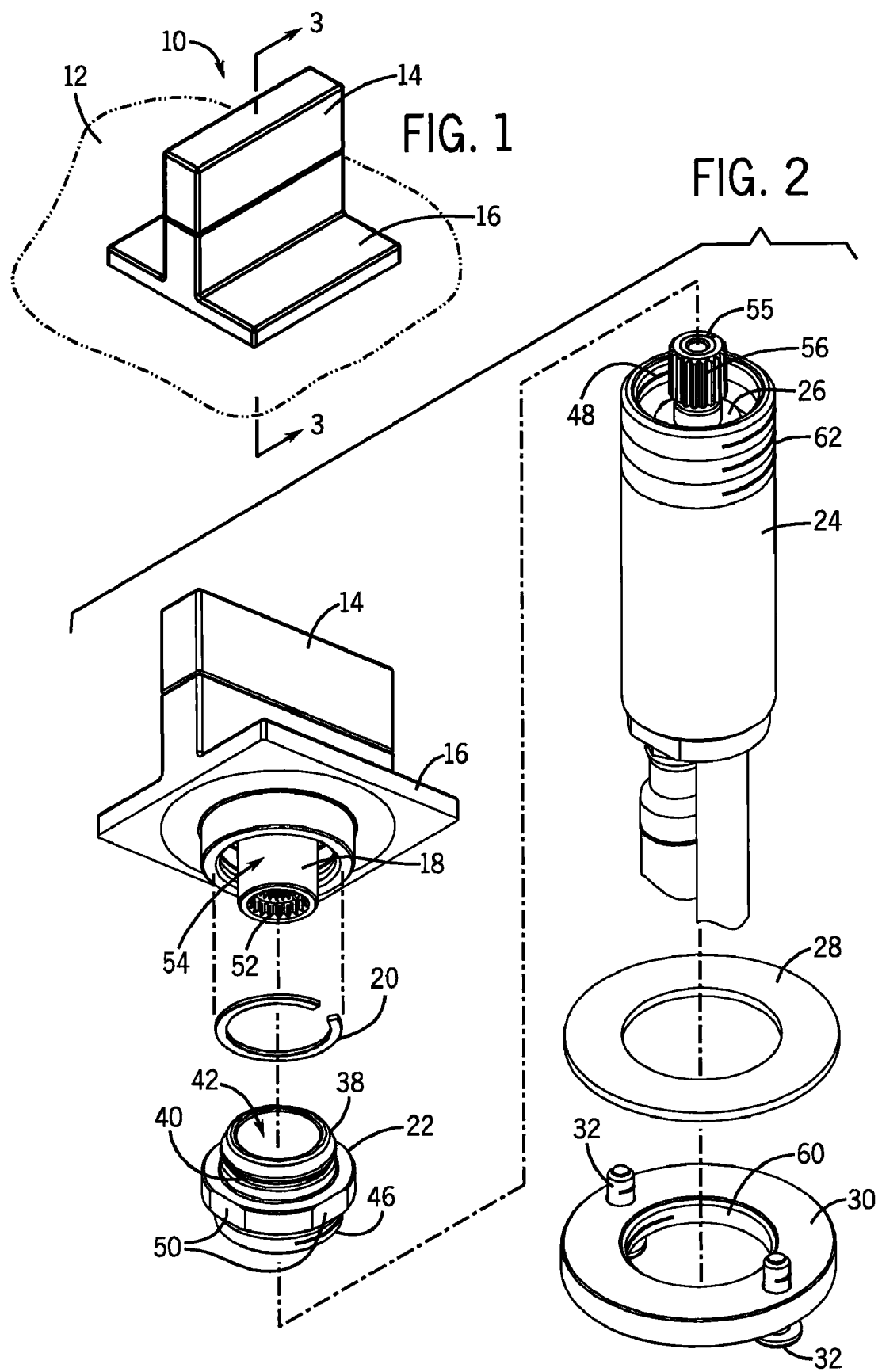

HANDLE ASSEMBLY FOR A WATER CONTROL VALVE

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to handles which are attachable to rotatable valve control stems. More particularly, the present invention relates to decorative handles that are preferably installed in a particular rotational alignment in the off position of the valve.

Conventionally, handle assemblies for operating a faucet are mounted on a base of the faucet, on a countertop, or on a back mounting ledge of a sink. There is usually also a decorative escutcheon under the handle which helps hide the hole through the mounting area.

Where the handle and the escutcheon are generally circular in cross section, it typically won't matter much aesthetically how the handle ends up through installation rotationally positioned in the "valve off" position. However, where the handle is configured in other shapes, especially where the escutcheon is as well, there can be a highly preferred rotational position for the handle when the valve is off, from an aesthetic standpoint.

This can be somewhat time consuming for an installer to achieve using conventional installation assemblies. The degree of tightening of a particular escutcheon or other feature can vary based on counter top thicknesses or other production tolerances.

Accordingly, there exists a need for an improved handle assembly that addresses these concerns.

SUMMARY OF THE INVENTION

In one aspect of the invention a handle assembly is disclosed that is suitable for mounting a valve housing that has a valve stem to a support. The handle assembly includes a handle operationally linked to the valve stem of the valve housing, for controlling movement of the stem.

An escutcheon is positionable on a first side of the support adjacent the handle. A bonnet is linked to the valve housing. A recess is formed in one of the bonnet and escutcheon. A flexible snap member is mounted to the other of the bonnet and the escutcheon and is suitable to snap into the recess when the bonnet and the escutcheon are telescoped together, while thereafter still permitting relative rotation of the bonnet and the escutcheon.

In preferred aspects, the flexible snap member may be a snap ring, the recess may be in the form of an annular recess on an underside of the escutcheon. Alternatively, both the bonnet and the escutcheon may have annular recesses, the snap member may be mounted in one such annular recess, and when the annular recesses of the escutcheon and the bonnet vertically align, the snap member may occupy at least a part of both of the annular recesses.

In yet another preferred form, the bonnet may have threads formed thereon for mating with threads formed on the valve housing.

In still yet another preferred form, the handle assembly may further include a clamping structure linked to the valve housing and positionable adjacent a second side of the support. The clamping structure may be capable of moving the escutcheon towards the first side of the support. The clamping structure may include a ring having threads that engage a threaded surface of the valve housing. The clamping structure may further include a post threaded to the ring and extendable towards the second side of the support.

In another form the valve housing may be mounted entirely below the first side of the support, while the escutcheon may be positioned entirely above the second side of the support.

In still other forms, the escutcheon may have a radially outward portion that takes on different shapes. In one form, the escutcheon may have a radially outward portion that is not cylindrical. In another form, the escutcheon may have a radially outward portion that is essentially rectangular.

In another aspect of the invention there may be a handle assembly that is suitable for mounting a fitting that has a valve stem to a support. The handle assembly includes a handle operationally linked to the valve stem of the fitting for controlling movement of the stem. An escutcheon is positionable on a first side of the support adjacent the handle. A recess is formed in one of the fitting and the escutcheon. A flexible snap member is mounted to the other of the fitting and the escutcheon. The flexible snap member is suitable to snap into the recess when the fitting and the escutcheon are telescoped together, while thereafter permitting relative rotation of the fitting and the escutcheon.

It will be appreciated that an installer can easily place the components of the handle assembly in the desired environment. The escutcheon can then be rotated to its optimal rotational position relative to the handle off position. Thereafter the assembly can be clamped in place by tightening bolts.

Thus, the present invention provides a low cost assembly that provides more aesthetic options for handle shapes and escutcheon shapes, without significantly increasing the difficulty of installation. The foregoing and other advantages of the present invention will become apparent from the following description. In that description reference will be made to the accompanying drawings which form a part thereof, and in which there is shown by way of illustration an example embodiment of the invention. The example embodiment does not limit the full scope of the invention. Rather, the claims should be looked to in order to judge the full scope of the invention.

BRIEF DESCRIPTION OF THE DRAWINGS

FIG. 1 is a top right perspective view of a handle assembly of the present invention installed on a support;

FIG. 2 is an exploded perspective view thereof;

DETAILED DESCRIPTION OF THE INVENTION

Referring first to FIG. 1, a handle assembly 10 is shown mounted on a support 12 (e.g. a counter top). The handle assembly 10 includes a handle 14 and an escutcheon 16. In operation, the handle 14 is rotated relative to the escutcheon 16 to control the flow of water through a valve (e.g. to a nearby faucet, not shown).

Note that handle 14 is generally rectangular in top view, as is a mounting pedestal portion of the escutcheon 16. It is highly desirable from an aesthetic standpoint that in the valve off position the handle and escutcheon be rotationally aligned as shown.

Apart from the aesthetic value of such alignment, it also serves a functional purpose. Where the handle is not so aligned, a user will know that the valve is not yet in the off position, and be encouraged to tighten the valve further. This can help avoid dripping faucets between uses. Of course, the escutcheon mount may be part of a faucet body, or may be part of a sink structure, or may have other configurations.

Figure 3:
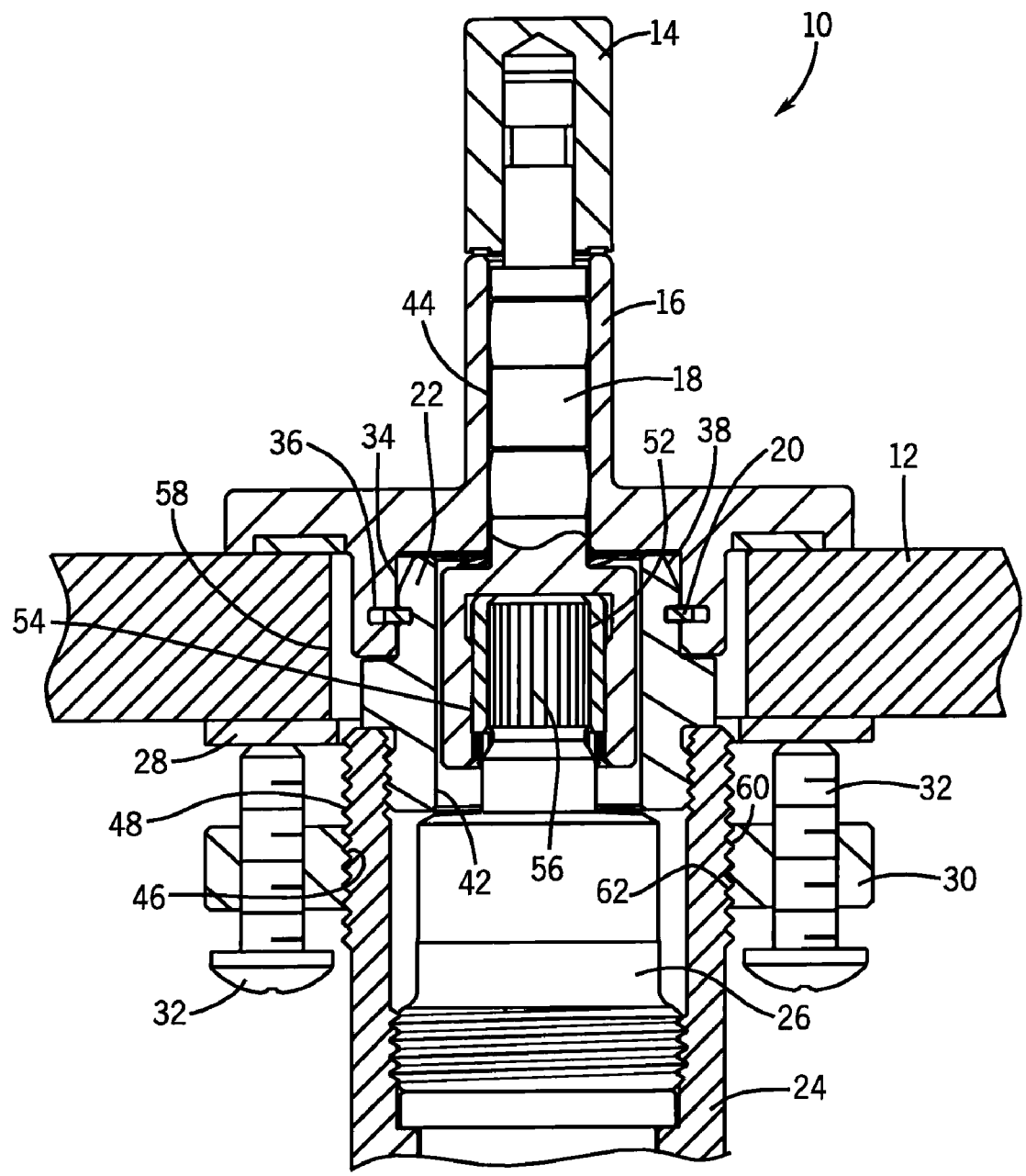
FIG. 3 is a cross-sectional view generally taken along line 3-3 of FIG. 1.

Referring now to FIGS. 2 and 3, the handle assembly 10 includes a valve stem adaptor 18, a snap ring 20, a bonnet 22, a valve housing 24 including a valve 26, a surface protector 28, and a clamping structure 30 having bolts 32.

The components are structurally configured to allow for the handle and escutcheon to have a low profile relative to the support 12. In this regard, the valve housing 24 can be mounted entirely below the upper surface of the support 12. Although the escutcheon 16 is positioned on the upper surface of the support 12 and a portion of the escutcheon 16 extends into the hole 58, the escutcheon 16 can be positioned entirely above the lower surface of the support 12.

The snap ring 20 is used to connect the escutcheon 16 to the bonnet 22, as will be understood from FIGS. 4-6 and 8-9. The snap ring 20 may be generally annular in shape, and will typically have an arcuate segment removed. The snap ring 20 may be made of an elastic material, such that the snap ring 20 can radially expand or contract as necessary when assembling the escutcheon 16 and the bonnet 22.

Figure 4:
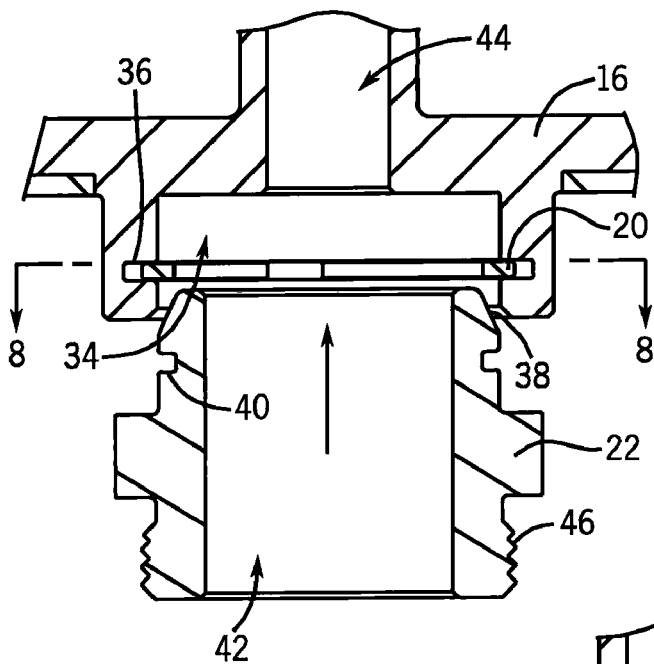
FIGS. 4-6 are enlarged cross-sectional details of parts of the FIG. 1 assembly during various stages of coupling.
Figure 5:
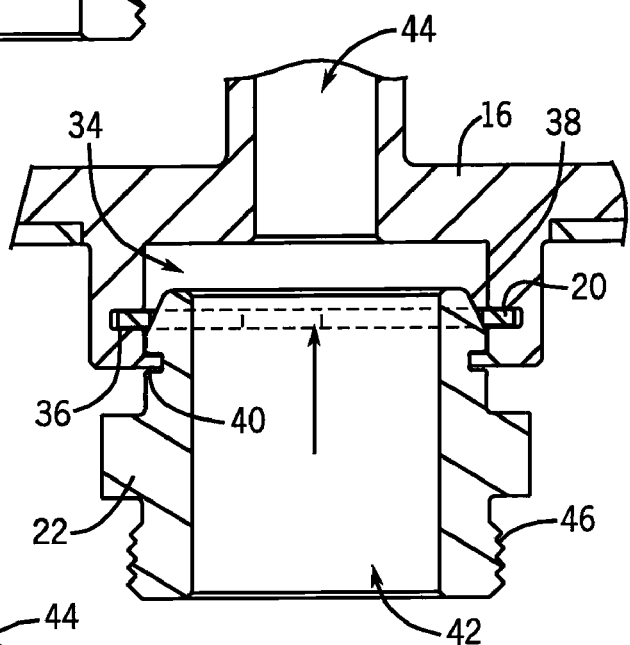
Figure 6:
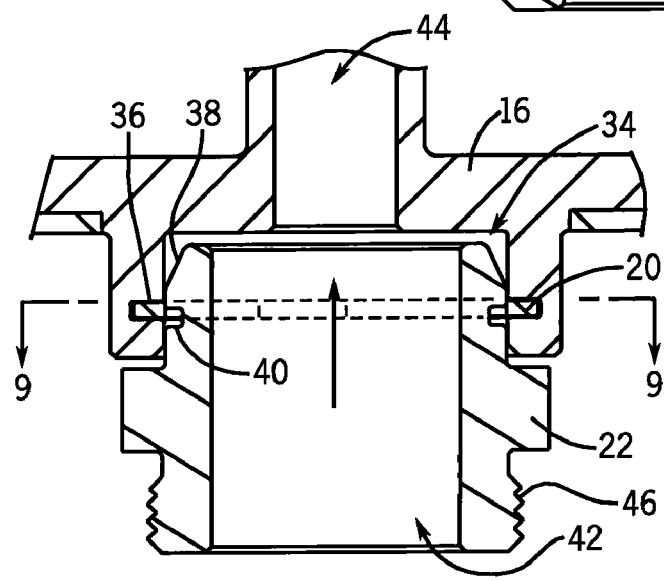

As shown in FIG. 4, the snap ring 20 can be initially compressed and captured in an annular recess 34 in a cavity 36 on the underside of the escutcheon 16. The bonnet 22 can then be telescopically inserted into the cavity 36. As this insertion occurs, a tapered leading edge 38 on the bonnet 22 forces the radially outward expansion of the snap ring 20, such as is seen in FIG. 5.

As the telescopic insertion continues, an annular recess 40 on the bonnet 22 nears and vertically aligns with the snap ring 20. As the snap ring 20 aligns with the recess on the bonnet 22, the snap ring 20 snaps radially inward occupying at least a part of both of the annular recesses 34 and 40. This occupation locks the escutcheon 16 and the bonnet 22 together, while still permitting relative rotation on a vertical longitudinal axis. In this regard, the snap ring 20 axially restricts the movement of the bonnet 22 relative to the escutcheon 16, but allows the relative rotation of the bonnet 22 relative to the escutcheon 16, assuming frictional forces are overcome.

It should be appreciated that other flexible snap members can be used instead of the snap ring 20. Moreover, it should be appreciated that the recess into which the flexible snap member is initially placed may be located on either the bonnet 22 or the escutcheon 16. For example, the flexible snap member could be mounted into a recess on the bonnet and then the bonnet and the escutcheon telescoped together such that the flexible snap member snaps into the escutcheon.

Further, although the bonnet 22 has been shown as being telescopically inserted into a cavity 36 of the escutcheon 16, other forms of connection are contemplated. For example, the bonnet and escutcheon may be formed such that a portion of the escutcheon is telescopically inserted into the bonnet. The connecting features (e.g., recesses) that support the snap ring are accordingly formed at the interface between the escutcheon 16 and the bonnet 22.

Additionally, it is contemplated that only a single recess may be necessary to retain the flexible snap member and connect the bonnet 22 to the escutcheon 16. For example, the formation of the connection of FIGS. 4-6 could be achieved if, instead of a recess, the bonnet 22 had two offset outer walls with a ledge there between that snags the snap ring 20. Moreover, the snap ring 20 could be mounted to one of the escutcheon 16 or the bonnet 22 and snapped into a recess formed in the other.

Figure 7:
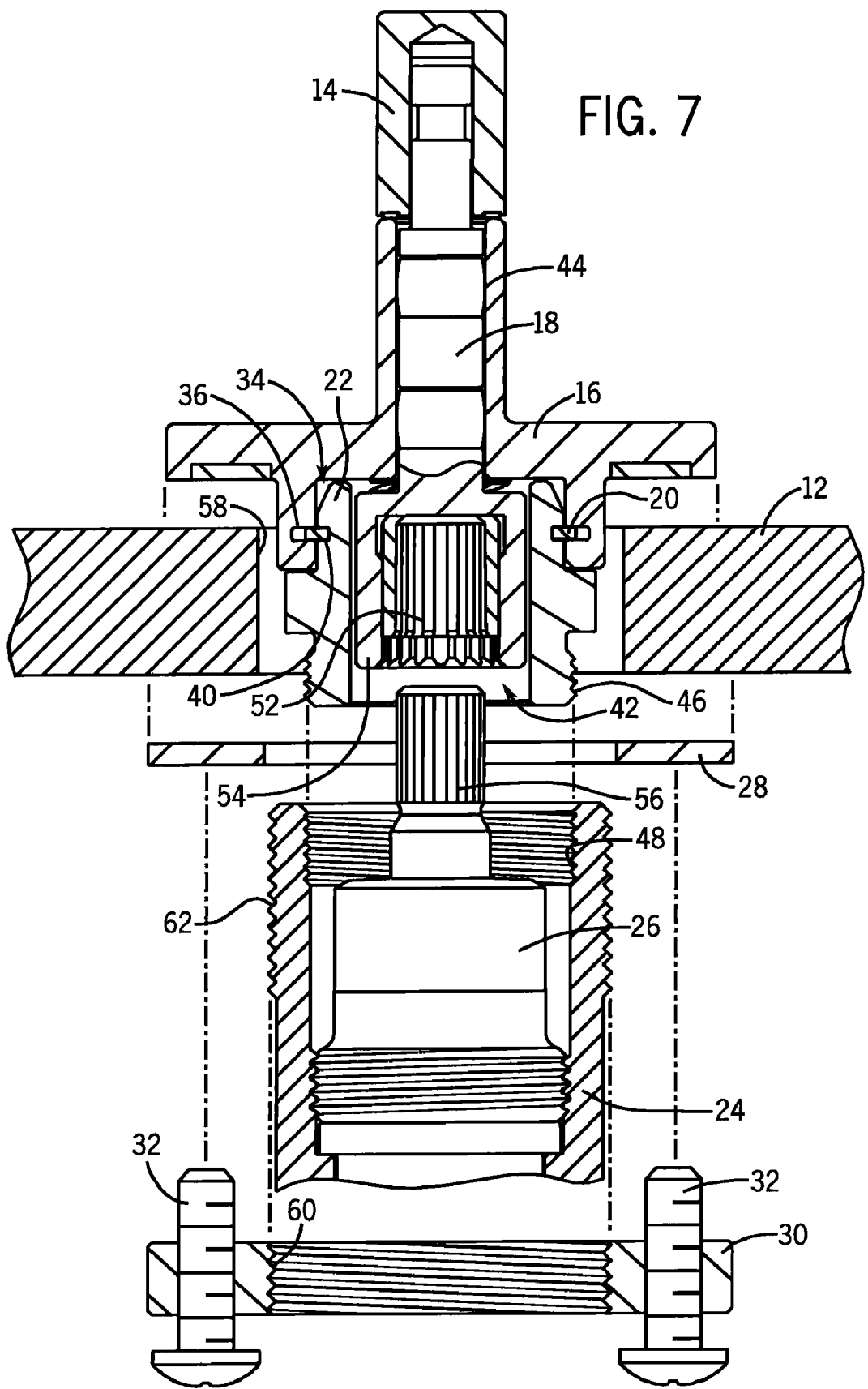
FIG. 7 is a view similar to FIG. 3, but partially exploded.
Figure 8:
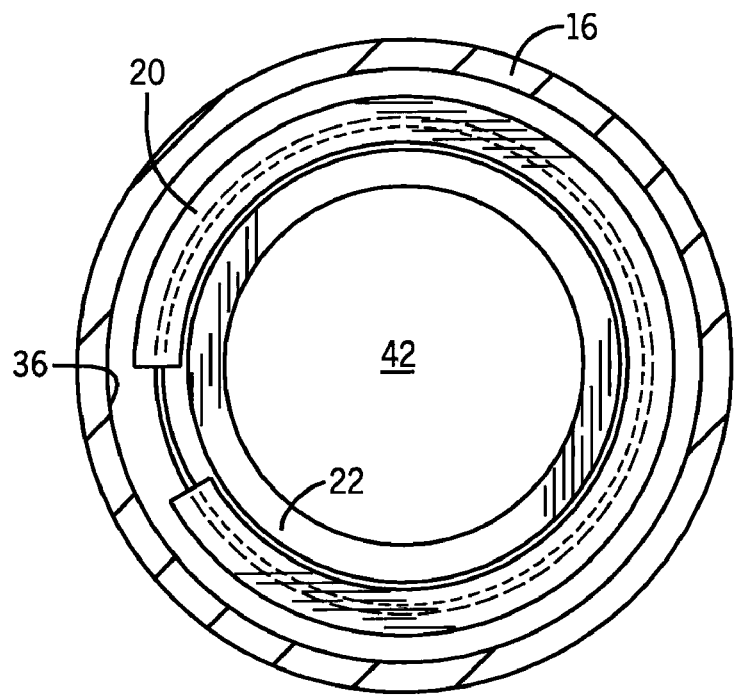
FIG. 8 is a cross-sectional view taken along line 8-8 of FIG. 4.
Figure 9:
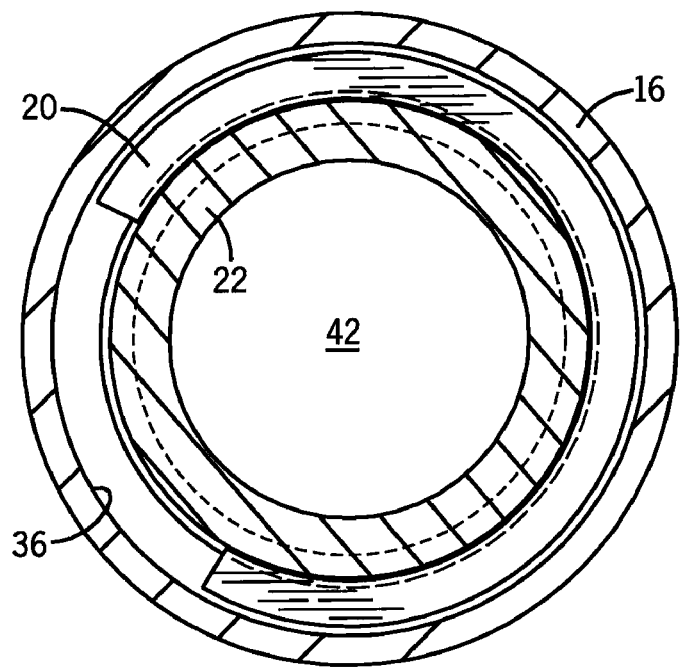
FIG. 9 is a cross-sectional view taken along line 9-9 of FIG. 6.

Referring now to FIGS. 3 and 7, once the escutcheon 16 and the bonnet 22 are connected by the snap ring 20, the valve stem adaptor 18 is placed in axial bores 42 and 44 that extend through the bonnet 22 and escutcheon 16, respectively. Onto the end of the valve stem adaptor 18 that extends from the escutcheon 16, the handle 14 is secured by snap means, friction fit, or other structures to operationally link the handle 14 to the valve stem adaptor 18.

Next, as shown in FIG. 7, the outer threads 46 of the bonnet 22 are threaded into the inner threads 48 of the valve housing 24. The bonnet 22 has flats 50 (seen in FIG. 2) that can be gripped as the valve housing 24 is tightened to the bonnet 22.

As this occurs, the splines 52 on the cupped end 54 of the valve stem adaptor 18 engage the splines 56 on the end of the valve stem 55 of the valve housing 24. Once the valve housing 24 is secured to the bonnet 22 and the handle 14 is rotated, the splines 52 and 56 engage one another to transfer the rotational motion from the valve stem adaptor 18 to the valve stem 55 for the operation of the handle assembly 10.

Importantly, even at this point in the assembly, the manner in which the components are assembled allows the handle 14, bonnet 22, and valve housing 24 to rotate freely relative to the escutcheon 16. Once the escutcheon 16, the bonnet 22, and the valve housing 24 are assembled, they are dropped through a hole 58 in the support 12.

The surface protector 28 and the clamping structure 30 are slid over the valve housing 24 from underneath. The surface protector 28 is placed on the underside of the support 12. The clamping structure 30 is ring-shaped with inner threads 60 that engage the outer threads 62 of the valve housing 24. The clamping structure 30 is loosely tightened such that the components are held in place, but are still adjustable with moderate force.

At this point, the components can be rotated to have their desired alignment. For instance, the base of the escutcheon 16 may be rotated to a desired orientation. Likewise, the handle 14 can be rotated relative to the escutcheon 16 such that the handle 14 aligns with the vertical leg of the escutcheon 16.

Once the components are aligned, then the bolts 32 of the clamping structure 30 can be tightly fastened to clamp the handle assembly 10 to the support 12. On one side of the support 12, the escutcheon 16 then grips the top surface of the support 12 (and thus won't rotate further), and on the other side of the support 12 the bolts 32 push into the surface protector 28 of the underside of the support 12.

When the handle assembly 10 is firmly clamped to the support 12, the bonnet 22 is not capable of free rotation relative to the escutcheon 16. In this condition, the movement of the handle 14 causes the rotation of the valve stem adaptor 18, which drives the valve stem 55 to open or close the valve 26.

Thus, the present invention provides a handle assembly that allow for more flexibility in the design of handles while reducing the difficulty of assembling them with a proper alignment. As most of the valve can be placed under the mounting surface, the handle and/or escutcheon can be reduced in size and/or have a low profile.

What has been described thus far is merely a preferred embodiment of the invention. Various other modifications could be made without departing from the spirit and scope of the invention. For example, the base of the escutcheon could have a square shape, or a flexible snap member other than a snap ring could be used to connect the bonnet to the escutcheon. Thus, the claims should be looked to in order to judge the full scope of the invention.

INDUSTRIAL APPLICABILITY

The present invention provides an improved handle assembly that allows for unusually shaped handles and escutcheons to be installed in proper alignment without incurring undesirable installation difficulties.

We claim:

1. A handle assembly configured for mounting a valve housing that has a valve stem to a support, the handle assembly comprising:
a handle operationally linked to the valve stem of the valve housing for controlling movement of the stem;
an escutcheon positionable on a first side of the support adjacent the handle;
a bonnet linked to the valve housing; the bonnet having threads formed thereon for mating with threads formed on the valve housing;
a recess formed in one of the bonnet and the escutcheon; and
a flexible snap member mounted to the other of the bonnet and escutcheon and suitable to snap into the recess when the bonnet and the escutcheon are telescoped together, while thereafter permitting relative rotation of the bonnet and the escutcheon.

2. The handle assembly of claim 1, wherein the flexible snap member is a snap ring.

3. The handle assembly of claim 1, wherein the recess is in a form of an annular recess on an underside of the escutcheon.

4. The handle assembly of claim 1, wherein both the bonnet and escutcheon have annular recesses, the snap member is mounted in one such annular recess, and when the annular recesses of the escutcheon and the bonnet vertically align, the snap member occupies at least a part of both of the annular recesses.

5. The handle assembly of claim 1, wherein the valve housing is mounted entirely below the first side of the support while the escutcheon is positioned entirely above a second side of the support.

6. The handle assembly of claim 1, wherein the escutcheon has a radially outward portion that is not cylindrical.

7. The handle assembly of claim 6, wherein the escutcheon has a radially outward portion that is essentially rectangular.

8. A handle assembly configured for mounting a valve housing that has a valve stem to a support, the handle assembly comprising:
a handle operationally linked to the valve stem of the valve housing for controlling movement of the stem;
an escutcheon positionable on a first side of the support adjacent the handle;
a bonnet linked to the valve housing;
a recess formed in one of the bonnet and the escutcheon;
a flexible snap member mounted to the other of the bonnet and escutcheon and suitable to snap into the recess when the bonnet and the escutcheon are telescoped together, while thereafter permitting relative rotation of the bonnet and the escutcheon; and
a clamping structure linked to the valve housing and positionable adjacent a second side of the support, the clamping structure being capable of moving the escutcheon towards the first side of the support.

9. The handle assembly of claim 8, wherein the clamping structure comprises a ring having threads that engage a threaded surface of the valve housing, and a post threaded to the ring and extendable towards the second side of the support.

10. The handle assembly of claim 8, wherein the bonnet has threads formed thereon for mating with threads formed on the valve housing.

11. The handle assembly of claim 8, wherein the valve housing is mounted entirely below the first side of the support while the escutcheon is positioned entirely above a second side of the support.

12. The handle assembly of claim 8, wherein the escutcheon has a radially outward portion that is not cylindrical.

13. A handle assembly suitable for mounting a fitting having a valve stem to a support, the handle assembly comprising:
a handle operationally linked to the valve stem of the fitting for controlling movement of the stem;
an escutcheon positionable on a first side of the support adjacent the handle;
a recess formed in one of the fitting and escutcheon; and
a flexible snap member mounted to the other of the fitting and escutcheon and suitable to snap into the recess when the fitting and the escutcheon are telescoped together, while thereafter permitting relative rotation of the fitting and the escutcheon until the position of the escutcheon is fixed relative to the support.

14. The handle assembly of claim 13, wherein the fitting comprises a bonnet coupled to a valve housing, the bonnet defining the recess configured to receive the flexible snap member.

15. The handle assembly of claim 13 further comprising a clamping structure linked to the fitting and positionable adjacent a second side of the support, the clamping structure being capable of fixing the escutcheon relative to the support.

16. The handle assembly of claim 13, wherein the fitting comprises a tapered end configured to cause radially outward expansion of the flexible snap member when the fitting and the escutcheon are telescoped together.

* * * * *